Patented Nov. 2, 1948

2,452,603

UNITED STATES PATENT OFFICE 2,452,603

METAL CONTACT RECTIFIER

Otto Saslaw, Lyndhurst, N. J., assignor to Federal Telephone and Radio Corporation, New York, N. Y., a corporation of Delaware No Drawing. Application April 8, 1944, Serial No. 530,181

4 Claims. (Cl. 175—366)

This invention relates to metal contact rectifiers, also known as dry rectifiers, and is especially directed to improvements in the structure and method of manufacture of selenium rectifiers. This invention is closely related to the invention disclosed and claimed in my U. S. Patents 2,386,750, granted October 16, 1945, entitled "Selenium cell," and 2,433,402, granted December 30, 1947, entitled "Selenium cell and lacquer therefor."

This type of rectifier comprises a rigid base plate formed from a conductive metal such as steel or aluminum, a semi-conducting selenium layer fused to the base plate and a counter-electrode layer of conducting metal on the selenium. The rectifying action is produced by a so-called barrier or blocking layer at the surface of the selenium contiguous to the counter-electrode; and this barrier layer is produced by passing a current of electricity between the electrodes in reverse direction until the requisite resistance is built up. Under these conditions the forward resistance of the rectifier will be only a small fraction of the reverse resistance. The characteristics of rectifiers tend to change somewhat during the first part of their life, gradually stabilizing after periods which vary with the type of rectifier and conditions of use. This operation is generally referred to as aging.

A primary purpose of the present invention is to provide a novel method and construction for improving the barrier layer, and in particular for improving the aging characteristics of the rectifier. This is accomplished in general by interposing between the selenium and the counter-electrode a thin layer of a suitable insulating varnish or lacquer containing selenium dioxide or other suitable conductive constituents, over which the counter-electrode is applied. This layer constitutes in effect an artificial barrier layer; and it has been found that the current leakage through the rectifier in the reverse direction is substantially reduced thereby without materially increasing the resistance to the forward current.

The varnish or lacquer should be of a type which not only is a good insulator and substantially inert with reference to the selenium, but also does not require the use of any solvents or other constituents which will materially affect the selenium layer. The varnish or lacquer advantageously has a base consisting principally of cellulosic material and may be a cellulose lacquer of one of the types known to be useful for insulating purposes. Such lacquers include those composed in major part of regenerated cellulose, cellulose esters or cellulose ethers and particularly those containing the lower alkyl radicals. These include cellulose formate acetate and propionate, and also methyl, ether and propyl cellulose. Cellulose nitrate has likewise been found to be especially effective as a base for lacquer used in the indicated manner. In particular, it may have a cellulose acetate base; and the selenium dioxide is preferably introduced in a solvent which is likewise a solvent of the cellulose acetate or other base material, or is compatible with a solvent of the latter. In addition to selenium dioxide I have discovered that other suitable conductive constituents may be incorporated in the lacquer to improve substantially the forward conductivity of the cellulose. Selenium iodide is another example of such a constituent and these substances may be incorporated separately or in combination in suitable proportions, the conductivity being in general increased, as the proportion of such constituent is increased.

Various formulas and methods of compounding have been set forth in detail in the prior application mentioned above. In general, a suitable lacquer may be prepared by dissolving the cellulosic material, such as cellulose acetate, in a suitable solvent, dissolving the selenium dioxide in a compatible solvent, and mixing the two solutions, the proportions being in the range known to those skilled in the art as suitable for making a fairly thin lacquer. When cellulose nitrate is used it is employed in the same proportions as cellulose acetate. The proportion of selenium dioxide or selenium iodide used may vary between the minimum amount which will produce an appreciable improvement in the barrier layer up to the maximum proportion that can be introduced from a saturated solution. Absolute ethyl alcohol has been found particularly advantageous as a solvent, since it is compatible and will dissolve the maximum proportion of selenium dioxide.

It will be apparent to those familiar with the manufacture of varnishes and lacquers that the formula and method of combining may be varied, particularly where different solvents, plasticizers or base materials are used. It has also been found that when making a composition of the type above indicated, the humidity of the circumambient air should be maintained at 60% or higher. When the humidity is lower, however, I prefer to incorporate moisture in the lacquer as more fully disclosed in my copending application, Serial Number 501,532, now Patent 2,386,750, issued October 16, 1945.

A lacquer of the indicated type may be applied to the surface of the selenium prior to the application of the counter-electrode, and will dry rapidly to form an artificial barrier layer that will reduce the reverse leakage current to a minimum without having any material effect upon the forward current. Moreover, rectifier discs made in this manner may be electroformed at much higher voltages than those ordinarily employed which do not exceed 20 volts, and they can stand a forming voltage up to about 30 volts without injury. The voltages at which the finished discs may be used are correspondingly increased. It has been found that where an artificial barrier layer of this type is used, the changes in characteristics incident to aging are materially reduced.

While a preferred embodiment has been described and certain variations have been indicated, this disclosure has been made by way of illustration rather than limitation since numerous variations in the specific lacquer composition can be employed without departing from the invention.

For convenience the coating materials indicated herein will be referred to generically as lacquers. However, it has been found that the cellulose lacquers, and particularly cellulose acetate lacquers, are especially suitable for this purpose.

What is claimed is:

1. A process of making a metal contact rectifier comprising fusing a semi-conducting selenium layer to a base plate, preparing a lacquer by dissolving a lacquer base in a volatile solvent, dissolving selenium dioxide in a compatible solvent and mixing the solutions, applying the lacquer to the selenium layer to form a coating, and applying a counter-electrode to the lacquer coating.

2. A process as set forth in claim 1 in which the selenium dioxide is introduced in a saturated solution.

3. A process as set forth in claim 1 in which the lacquer base is a cellulosic material, and the selenium dioxide is dissolved in alcohol.

4. A process as set forth in claim 1 in which the lacquer base is a cellulosic material, and a cellulose precipitation inhibiting constituent is introduced into the lacquer solution.

OTTO SASLAW.

REFERENCES CITED

The following references are of record in the file of this patent:

UNITED STATES PATENTS

| Number | Name | Date |
| --- | --- | --- |
| 2,137,428 | Van Geel et al. | Nov. 22, 1938 |
| 2,139,731 | De Baer | Dec. 13, 1938 |
| 2,197,497 | Geisler et al. | Apr. 16, 1940 |
| 2,328,440 | Esseling et al. | Aug. 31, 1943 |
| 2,339,613 | Becker et al. | Jan. 18, 1944 |
| 2,386,750 | Saslaw | Oct. 16, 1945 |